(12) United States Patent
Freudelsperger

(10) Patent No.: US 6,764,273 B1
(45) Date of Patent: Jul. 20, 2004

(54) DEVICE FOR UNSTACKING CONTAINERS

(75) Inventor: Karl Freudelsperger, Hart Bei (AT)

(73) Assignee: Knapp Logistik Automation GmbH, Gräz (AT)

( * ) Notice: Subject to any disclaimer, the term of this patent is extended or adjusted under 35 U.S.C. 154(b) by 0 days.

(21) Appl. No.: 09/622,131

(22) PCT Filed: Feb. 12, 1999

(86) PCT No.: PCT/AT99/00038
§ 371 (c)(1),
(2), (4) Date: Aug. 11, 2000

(87) PCT Pub. No.: WO99/41172
PCT Pub. Date: Aug. 19, 1999

(30) Foreign Application Priority Data
Feb. 13, 1998 (AT) ............................................. 259/98

(51) Int. Cl.[7] .............................................. B65G 59/10
(52) U.S. Cl. .................. 414/798.9; 221/238; 414/795.6
(58) Field of Search ........................... 414/795.6, 795.8, 414/796.4, 798.9; 221/238

(56) References Cited

U.S. PATENT DOCUMENTS

| | | | | |
|---|---|---|---|---|
| 4,054,212 A | * | 10/1977 | Mueller ................... | 414/795.6 |
| 4,915,578 A | * | 4/1990 | Becker ..................... | 414/797.6 |
| 4,967,930 A | | 11/1990 | Koltze ...................... | 221/222 |
| 4,983,098 A | * | 1/1991 | Heisler ..................... | 414/798.9 |
| 5,013,213 A | | 5/1991 | Roberts .................... | 414/798.9 |
| 5,547,335 A | * | 8/1996 | Lovett et al. ............. | 414/795.6 |
| 5,746,570 A | * | 5/1998 | Gujda et al. .............. | 414/795.6 |

FOREIGN PATENT DOCUMENTS

| | | | |
|---|---|---|---|
| DE | 30 42 903 A1 | * | 6/1982 |
| DE | 3829990 A1 | | 3/1990 |

\* cited by examiner

*Primary Examiner*—Janice L. Krizek

(57) ABSTRACT

An arrangement (1, 1') for automatically unstacking containers (6, 6') nested in each other in lying posture, by depositing them on a support, e.g. a conveyor (3a), with the container opening (6a) facing upwards, the arrangement comprising a gripping device (5) for gripping and moving out the respective first container (6) of a lying container stack (2, 2'), the gripping device (5, 5') being arranged on holding elements (8a, 8b) movable in stacking direction, and further comprising a clamping device (4) for holding back the lying container stack (2, 2'), with the foremost container (6) being left free, wherein the gripping device (5) is provided with lateral pressure-medium cylinders (5a; 46) which have horizontal axes on the same level and which are connected with the holding elements (8a, 8b) extending thereabove.

40 Claims, 9 Drawing Sheets

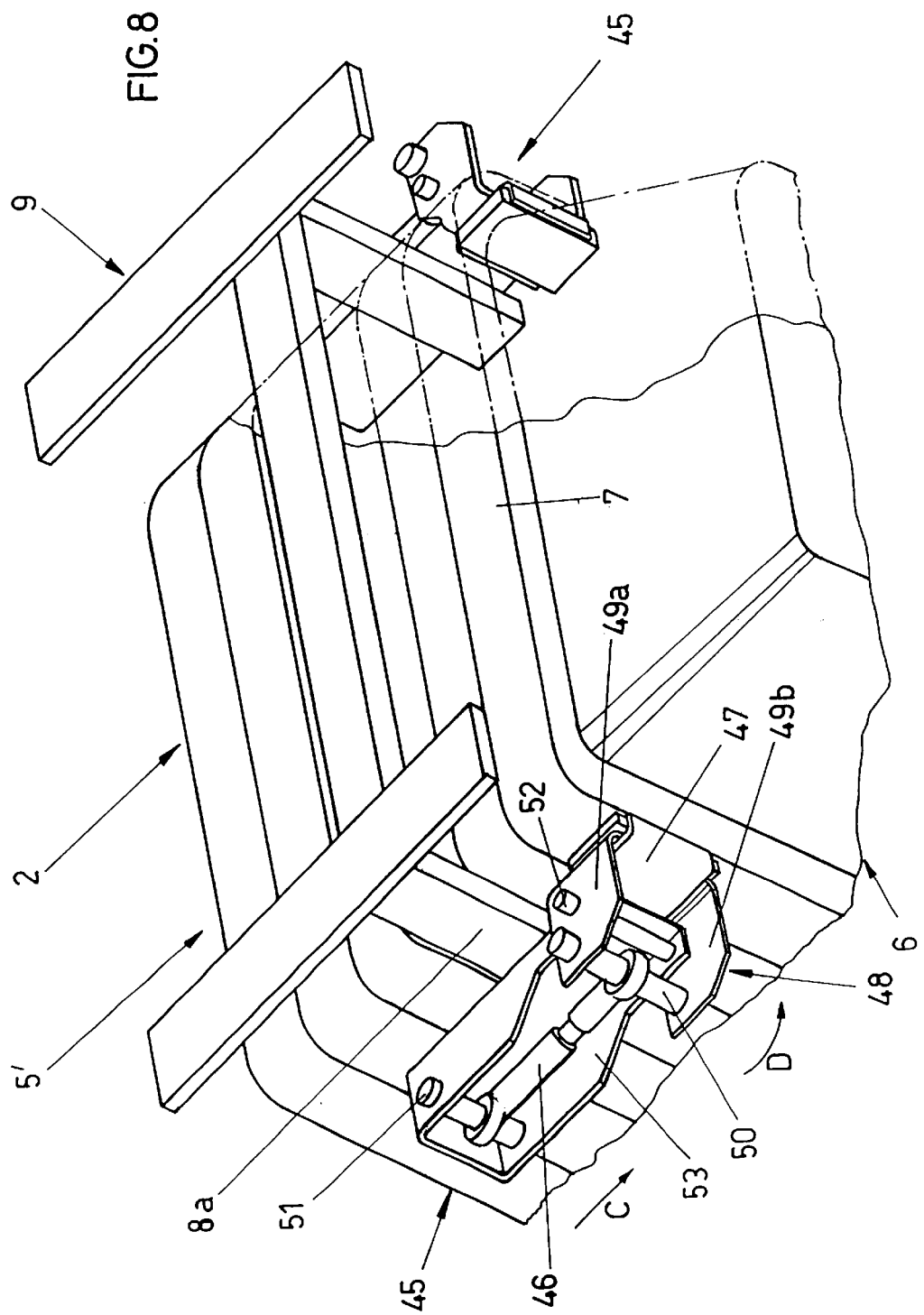

DEVICE FOR UNSTACKING CONTAINERS

The invention relates to an arrangement for automatically denesting containers in lying position and nested in each other, the containers being deposited on a support, e.g. a conveyor, with the container opening facing upward, the arrangement comprising gripping means for gripping and moving out a respective first container of a lying container stack, the gripping means being arranged on holding elements movable in the direction of the stack, and further comprising clamping means for holding back the lying container stack, with the foremost container being left free.

Containers which as a rule have frusto-conical shapes, i.e. have oblique walls, are stored in stacks in warehouse stocks or in commissioning systems, e.g., and they must be denested again before use and supplied individually for filling. Denesting should occur rapidly and gently and, in particular, it should be automated since the individual containers are supplied to conveying means in intermittent manner, and manual denesting would be very laborious.

In DE 3 042 903 A, automatic denesting has been described. Here, a lifting mechanism is provided which engages the respective uppermost container of a vertical container stack advanced on a conveyor belt, which lifts this uppermost container and which deposits it on a conveyor belt. What is of disadvantage is that the lifting mechanism is relatively complex in construction, primarily since it must engage containers at ever changing levels; moreover, the vertical container stacks pose problems if they have to be advanced over larger distances since, in case of major stack heights, they have little stability and topple easily if their movement is started or stopped with jerks.

According to U.S. Pat. No. 4,915,578 A, a vertical container stack is top-delivered to a holding device, the lowermost container being left free so that it drops onto a conveyor belt provided therebelow and is moved off by aid of the same. In detail, two oppositely arranged flange rims of the containers lie on projecting tooth ledges of a chain, which tooth ledges guide the containers downwardly in still stacked manner. By means of projections engaging the two oppositely arranged rims of the lowermost container from above, a second chain moving faster and in counter-direction pushes this lowermost container from the stack downwards to below so that it drops to the conveyor belt at last and is transported away. Here, too, it is a disadvantage that the stack is provided vertically, with the risk of tilting, as already described before, primarily in case of major stack heights. Moreover, the devices used must be built high, increasing construction costs. The container stack must not exceed a certain height also because otherwise it would become too heavy and the stack could no longer be carried by the device.

In U.S. Pat. No. 4,983,098 A, an arrangement of the present type is described, for providing cup-shaped conical containers individually before they are filled and closed, the containers being delivered in vertical stacks which are turned over. From the lying container stack, the foremost container is gripped by vertically movable lug members which then are moved horizontally together with the foremost container so as to pull it away from the remaining stack. At the same time, the second container is held back by like, vertically movable lug members. To be put into an upright position, the foremost container moves against a pivotable hook member which grips the upper container rim at its inner side so that the container is decelerated at its upper rim while it is transported on on the conveyor; this results in upright tilting of the container. A disadvantage is that the lug members which engage behind the container rims with one of their legs must be precisely adapted to the containers and that their vertical movement requires a relatively complex driving means which in parts must be mounted laterally of the conveyor.

In U.S. Pat. No. 4,054,212 A, finally, an arrangement for downwardly tilting cup-shaped containers, bottoms first, is described, wherein this denesting should be effected in an automatic drink dispenser. The cups are pushed forwards by pivotable ram arms via arcuate rails until they fall into a holding means on a conveyor. At the same time, the second cup of the stack is kept back by gripping fingers. This construction is provided for denesting cups, and it is hardly suitable for containers of substantially larger mass.

It is an object of the invention to provide an arrangement for denesting, as initially indicated, with which it is possible to denest nested containers in a rapid and reliable manner, by using simple construction measures, as well as with a high flexibility as regards container dimensions.

The arrangement according to the invention of the initially defined kind is characterized in that the gripping means is provided with lateral pressure-medium cylinders which have horizontal axes on the same level and which are connected with the holding elements extending thereabove. Because of the lying posture of the container stack, the structural height of the arrangement can be a low one, and also the containers need not be lifted or need be lifted only slightly. Thus, the "overhead"-arrangement of the holding elements does not pose any problems. The use of pressure medium cylinders for the gripping means allows for a simple mode of construction, while nevertheless an easy, reliable and rapid gripping of the foremost container is possible. Since the pressure medium cylinders have horizontal axes on the same level, the foremost container is tightly held between the pressure medium cylinders, with the containers neither tilting nor sliding off-center.

The entire lying or horizontal container stack can be lifted from its support by a lifting mechanism before the foremost container is moved on, the lifting mechanism being capable of reaching between rollers of a roller conveyor provided as support, e.g.; the lifting mechanism may, however, also be built with rails or lifting ledges engaging laterally on the lower side of the container stack, in which case the stack support may also be formed by a conveying belt. Lifting of the container stack reliably prevents frictional sliding of the first container along the support while it is being pulled away from the container stack. Apart from the fact that the containers and the conveyor are carefully treated thereby, in this manner the amount of energy employed is minimized.

The pressure medium cylinders provided according to the invention may engage the respective container frictionally or positively, and suitably they are simply released from the container after the respective container has been moved away from the remaining stack and after it has been pivoted, and thus this container is simply dropped onto its support; the dropping height may be low so that a gentle "depositing" of the containers nevertheless is ensured. The pressure medium cylinders are to be designed such that they are capable of transmitting the respective transverse forces; optionally, also a lever mechanism can be provided. For pivoting of the containers while providing them individually, it is particularly advantageous if the pressure medium cylinders are rotatably arranged on the holding elements.

It is particularly advantageous if the holding elements are mounted to be linearly displaceable in parallel to the container stack. In this manner, the foremost container is linearly moved away from the remaining container stack. The foremost container suitably is gripped at its opening rim or collar facing rearwards, and is pushed from the container stack with its bottom facing forwards, the container bottom of the foremost container at least in the starting phase of pushing from the stack being located at a distance above the support so that the container does not chafe on the support.

The pressure medium cylinders, or their piston rods, respectively, may be oriented coaxially, and may be provided with a rubber head or the like with which they can be pressed softly against the container and safely against slipping aside therefrom. In the case of rotatable pressure medium cylinders, simple pivoting of the foremost container about the horizontal axis of the pressure medium cylinder into a substantially horizontal position is enabled, i.e. with the opening facing upwards, wherein only the pressure medium cylinders carry out a rotational movement and other parts of the gripping means would not have to be rotated.

Moreover, it is advantageous if the holding element, e.g. the legs of a frame, are mounted on a linear guide. In this case, a pressure medium cylinder may press the frame in the direction away from the container stack, and by the frame it is ensured that both sides of the container will be gripped and moved simultaneously, whereby the container will remain exactly straightly aligned and not get stuck by jamming, e.g. because of a slight turning out of this longitudinal alignment on the container stack.

For a simple depositing of the containers, it is particularly advantageous if the support receiving the denested containers is preceded by an edge provided at a higher level relative thereto, for tilting of the individual containers. After the foremost container has been moved out of the container stack as described above, it is moved in lying posture, with the container bottom facing forwards, to the edge, and there it is released for turning by tilting about this edge and for deposit on the support following the edge, e.g. a conveyor. In this case, the container must be pulled away from the next container merely by a short distance, and it can be guided to the edge by means of a conveyor, e.g. a conveyor belt or a roller conveyor. As soon as a sufficiently large part of the container projects beyond this edge, it will tilt, as a consequence of gravity, with the container bottom downwards to the support located at a somewhat lower level, and there it comes to stand upright. From there it will be led away immediately to make room for the next container. The edge will be provided as close to the denesting arrangement proper as possible, so that the individual lying container need not be transported far before it tilts onto the support. In terms of construction it is also possible to make the height difference of these two supports adjustable, e.g. in that the consecutive support is shiftable in terms of height, or in that it is mounted to be pivotable about an axis, wherein, optionally, an ascent or a descent is brought about. In this manner, differently sized containers can be provided individually. To avoid rubbing of the containers along the support, the pressure medium cylinders here preferably are not rotatable, but fixedly mounted on the holding elements, and thus they carry the entire mass of the container.

A further preferred arrangement is characterized by a cam control for the holding elements so as to move the foremost container according to a predetermined, in particular arcuate, movement out of the container stack and deposit it on the support, e.g. the conveyor, by pivoting it into a position with the container opening facing upwards. The amount by which the container is lifted will depend on the depth of the container. In any event, by the pivoting movement, slipping of the container on the support and thus an increased frictional resistance can largely be avoided. The container openings of the containers in the lying container stack may face forwards, whereby pulling out and turning of the respective foremost containers can be realized particularly simply in one single, continuous movement. Yet the containers may also be provided with the container bottom facing forward, in which case pivoting of the container will be caused only after the foremost container has been pulled away from the stack.

As has already been suggested, in the last-mentioned embodiment, it is advantageous for minimizing movement during denesting if the foremost container is moved away from the lying container stack with its opening facing forward. While the foremost container is moved out and upwards, it will tilt automatically into a position with the container opening facing upwards, most simply by the container's center of gravity being arranged behind or below the point of engagement of the gripping means on the container, whereby the container seeks to assume the lowermost position.

To controlledly pull the foremost container out of the container stack it is also advantageous if the holding elements, e.g. the legs of a frame, are pivotably mounted. In this manner, the various individual movements of the foremost container will be combined and coordinated with each other in a very simple manner: At the same time as the first container is pulled out of the container stack, the axis of the pressure medium cylinders and thus also of the containers is arcuately moved forward and upwards by the pivotal movement of the holding elements, which movement is assisted by the oblique container walls, since in this manner, frictional slipping of the container on the support is prevented; when pivoted further, the container finally assumes its position with the opening facing upwards.

The holding elements may also have an associated connecting-link guide or a four-bar linkage for control of their movement. The movement of the holding elements and, thus, of the containers may be optimized so that merely minimal lifting of each foremost container is effected while it is being pulled away from the stack, without lifting the container for an unnecessary large distance to then lower it immediately thereafter and to put it onto the support.

To efficiently effect the translation or pivotal movement of the holding elements, preferably pressure medium cylinders are provided as drive for the holding elements.

To grip the foremost container particularly tightly, it is advantageous if the gripping means comprises gripping jaws to be pressed against the container, which are attached on pivoting levers engaged by the pressure medium cylinders. The pivoting levers in this case are pivotably mounted, e.g. on brackets fixedly attached on the holding elements. By actuating the pressure medium cylinders, the pivoting levers are pivoted about their pivot axis, and thus the gripping jaws are pressed against the foremost container. Should the foremost container be jammed in the next container, the gripping jaws are further pivoted by the forward movement of the holding elements and pressed more tightly against the foremost container. This increases the pressing effect, and the foremost container will reliably be moved out of the container stack.

To pull the first container out of the container stack, a particularly simple construction becomes possible if the clamping means contains a pressure medium cylinder which presses at least the second container in the stack downwards, preferably in combination with a lifting mechanism which lifts the entire lying container stack.

To ensure a safe positioning and holding back of the container stack, the clamping means may also have an associated stop for the container stack, which stop can be moved out of the way of the containers, e.g. by pivoting. The arriving container stack is stopped by the stop at precisely the correct position for clamping retention. While subsequently the gripping means grips the foremost container, the stop can, quickly be moved out of the way, e.g. by pivoting, so that removal of the foremost container from the container stack will not be impeded thereby. After this container has been removed, the stop can be activated again so as to stop the remaining container stack, which has been moved forward in the correct position regarding the clamping means. It is also possible that one stop is provided on each lontigudinal side of the container stack on the support, e.g. on the conveyor.

Moreover, it is also advantageous if a trigger photoelectric barrier is provided for actuating the pressure medium cylinder and/or the stop. In that case, the trigger photoelectric barrier exactly controls the temporally correct actuation of the pressure medium cylinder and or the stop, respectively, if the container stack is moved forwards in each instance. The trigger photoelectric barrier may, e.g., be provided on the support in the region of the lifting means or laterally on the stand.

It is also advantageous if a monitoring photoelectric barrier is provided for sensing the remaining containers of the stack. With this, the clamping means can be switched off if all the containers of a stack have been provided individually, and/or a further container stack can be requested in time.

Optionally, a vertical container stack may be turned over to the horizontal on a conveyor prior to denesting, so as to provide the container stack in lying posture. In this manner, the containers may previously be stacked to a vertical container stack which, as a rule, is easier than stacking in lying posture. For denesting, suitably already turned, lying container stacks are supplied so that their advancing can be effected without any problems, wherein also several turned container stacks may be slid into one another prior to denesting.

Accordingly, it is suitable if the gripping means is preceded by a pneumatically actuated stack turning device. Thus, stacking of the containers may be effected in vertical state and denesting them in lying state. By the pneumatic actuation, simple control and reliable functioning of the stack turning device is achieved.

A stack turning device of advantageous function is obtained if it comprises a stack sliding support which is vertical in the resting position and is pivotable about a horizontal axle. The vertically upright container stack leans against this sliding support. The sliding support is at least as long as the container stack is high so as to support the latter during the turning movement. The sliding support pivots, e.g. by aid of a pressure medium cylinder, about an upper horizontal axis, the lower end moving the lowermost containers of the container stack out of the upright position so that the stack begins to tilt. For a minimum force to be applied, the axle about which the sliding support tilts is provided in the upper region of the sliding support, whereas the pressure medium cylinder driving it engages as low on the sliding support as possible, whereby the lever action is best utilized. The container stack is supported by the sliding support while being turned to a lying posture, the pivot movement of the sliding support being continued such that both the sliding support and the container stack assume an ever more slanted position, yet with the lowermost container always remaining in "bottom" contact (with the conveyor). As soon as a certain minimum inclination has been attained, the container stack will slide down along the sliding support and thus will come to lie. Such sliding is assisted by a guided movement of the lowermost or foremost container, respectively, on the support, e.g. by the support being a driven conveyor, e.g. a conveyor belt. The latter may immediately transport away the lying container stack so as to make room for the next container stack. The next upright container stack is brought to the turning device by a conveyor so that the stack again abuts on the sliding support which meanwhile has been pivoted back into its starting position.

A particularly advantageous construction provides that a roller is provided opposite the sliding support on a stand, which roller forms a stack stop when turning the stack into the horizontal position. This roller may be mounted on a transverse beam of the stand so that the upper stack region abuts on the roller and is held back by the latter while the sliding support carries out its pivotal movement. Also several rollers mounted on the stand in spaced-apart relationship would be conceivable.

A simple, efficient construction is also obtained if the stack turning device comprises angled forked arms mounted so as to be pivotable about their horizontal angle axis. In that instance the—vertical—container stack is pushed onto the one fork arms until it comes to abut on the upright second fork arms provided approximately at right angles to the former. The upright fork arms subsequently are pivoted into the horizontal, thereby acting as support for the stack which simultaneously is held by the other, originally horizontal fork arms, which are tilted up into a vertical position, so that in doing so, the stack is always kept and manipulated under control.

A particularly preferred construction is characterized in that the stack turning device comprises supporting devices for the container stack, which are movable relative to each other and which have associated separate pressure medium cylinders for their independent pivotal movement. These supporting devices may, e.g., be two pairs of fork arms which are pivotable upwards and downwards independently of each other about a mutual horizontal axis or about separate horizontal axes of their own, in the region of the support, i.e. the conveyor.

For a continuous operation of the automatic denesting, a container rotating device for rotating the denested box-type containers from their transverse orientation into a longitudinal orientation is advantageous. In this manner, the containers are automatically moved on in the longitudinal orientation usually desired in commissioning systems, e.g., and this even if the containers are obtained in transverse orientation after denesting, which frequently will be the case since with lying stacks, for reasons of stability the containers will arrive with their larger side face lying on the conveyor.

For use in commissioning systems, it is also advantageous if the container rotating device has an associated control unit for rotating each container with a predetermined side facing forward. In commissioning systems, in most instances the front walls of the containers carry documents, codes etc. which are important for the controlled movement of the container through the commissioning system and for its filling. In that instance, reading units are provided in the commissioning system for the proper function of which the correct orientation of the containers is important.

A particularly simple construction of the rotating device consists in that it comprises two stops, e.g. cylinders, adjacently arranged on the conveyor provided as the support and selectively projectable across the conveying plane, after which the conveyor preferably narrows. Depending on the direction in which the container is to be rotated, one or the other cylinder lowers so that it no longer projects from the conveying plane. The container which has been advanced is stopped on one of its sides by the one projecting cylinder, while the other side of the container is moved on by the conveyor. This results in a rotation of the container about the protruding cylinder, past which it is guided. The guides on both sides of the conveyor narrow in transporting direction until the distance between them allows only the passage of a longitudinally oriented container. In this narrowed portion, the container which has already been rotated to some extent is forced to a complete longitudinal orientation.

As has already been mentioned, according to the present invention stacks of differently high containers can be denested without any problems. For the differently high containers subsequently being specifically usable for their respective tasks, they have to be distributed according to their heights. Accordingly, preferably a shunting means is provided for distributing the individually provided box-type containers to various conveying paths, e.g. in accordance with their container height. In most instances, two consecutive conveyors will be present, at least one pivotable lever or pivot arm in each case merely leaving the desired consecutive conveyor accessible by which the container is to be conveyed, and blocking access to the other consecutive conveyor.

For a simple recognition of the container height of the container which has just arrived, it is advantageous if the shunting means has a preceding container height sensor, e.g. with photoelectric barriers at different levels. If a container of a certain height is moved past the sensor, the latter senses this and transmits a signal corresponding to the sensed container height, for pivoting the lever or pivot arm into a certain position.

In the following, the invention will be further explained by way of preferred exemplary embodiments illustrated in the drawings to which, however, it shall not be restricted. In detail, FIGS. 1a to 1d schematically illustrate different phases of the operation of a particularly preferred arrangement for automatically denesting nested containers in side view, the foremost container being moved away from the container stack by means of linearly shiftable gripping means;

FIG. 1e shows a schematic end view of the arrangement illustrated in FIG. 1a;

Figure 3A:
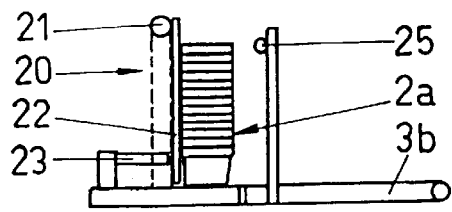
Figure 3B:
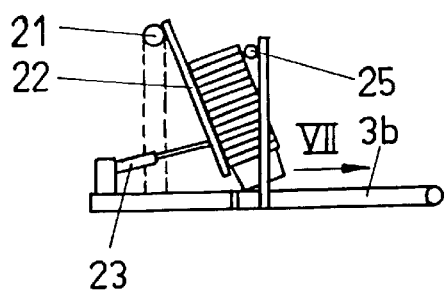
Figure 3C:
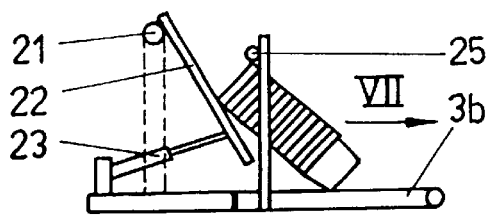
Figure 3D:
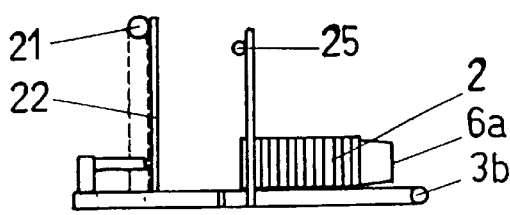
Figure 3E:
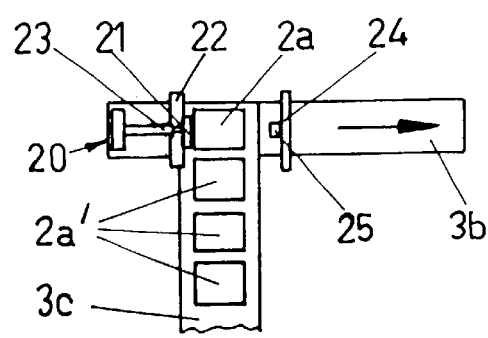
Figure 4A:
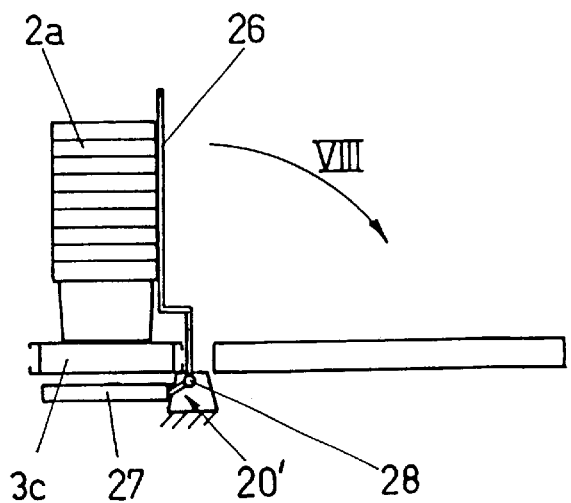
Figure 4B:
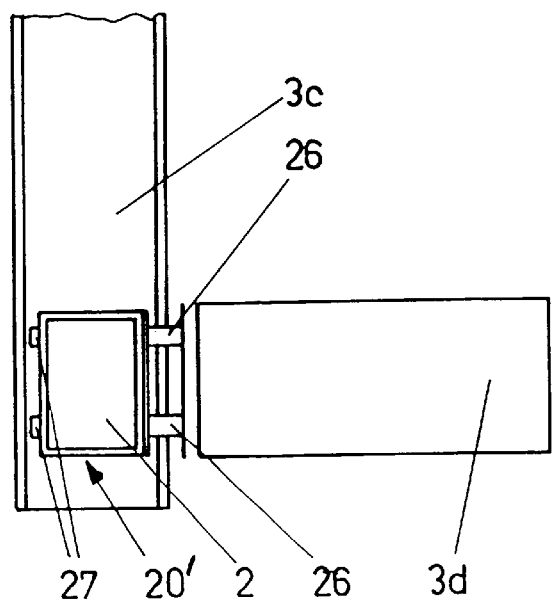
Figure 4C:
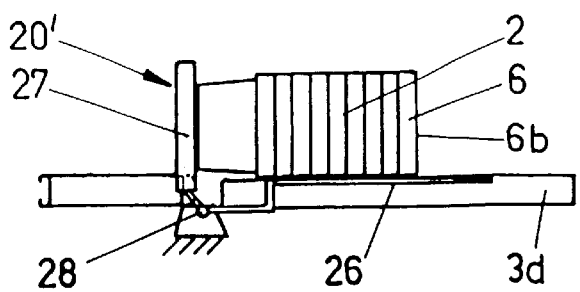
Figure 5A:
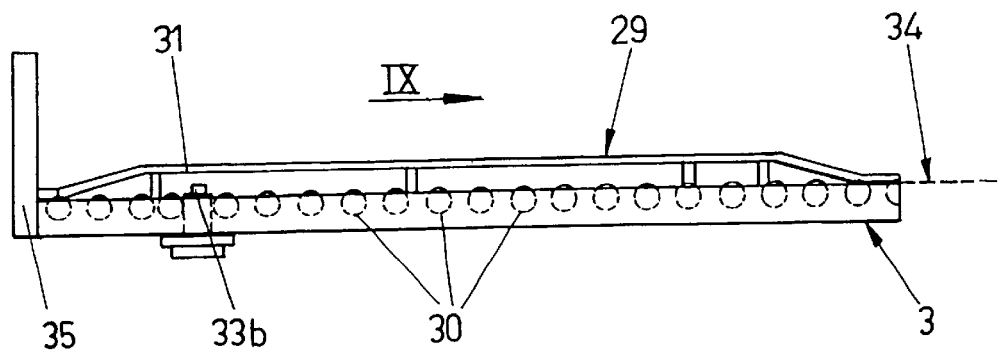
Figure 5B:
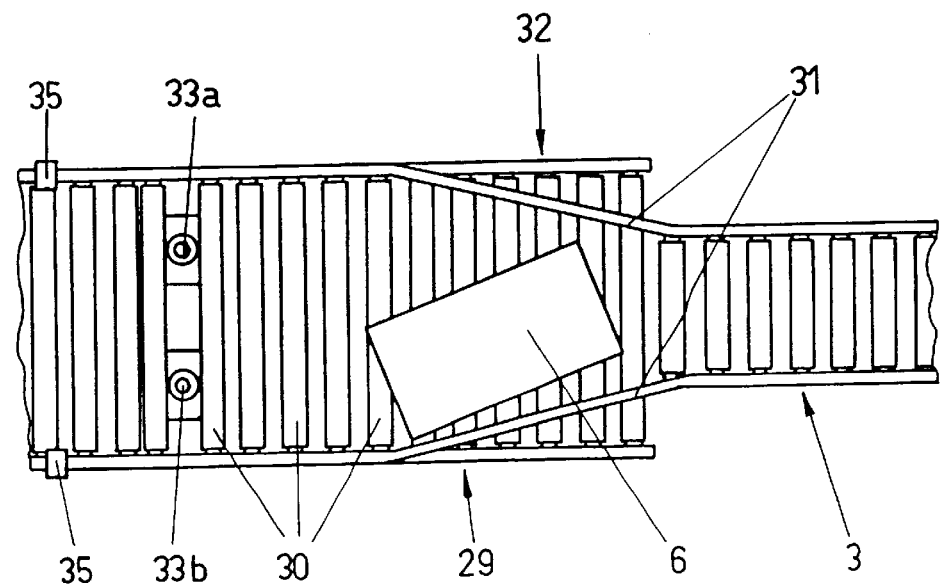
Figure 6:
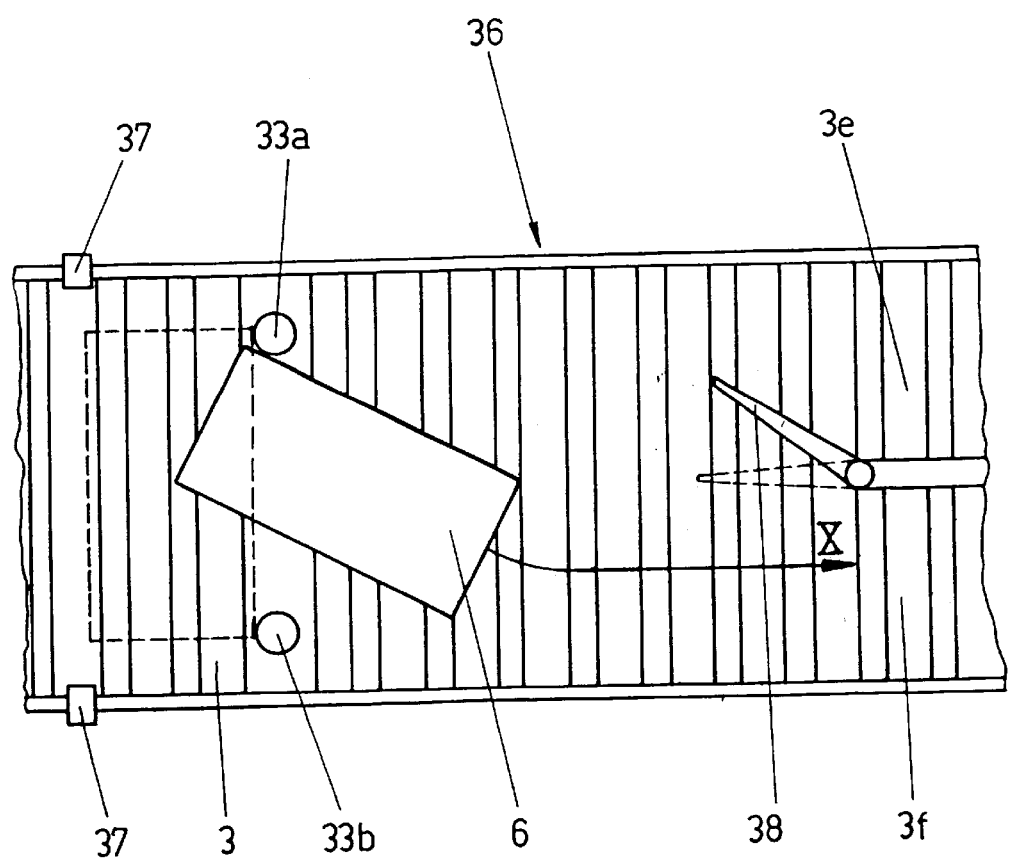

FIGS. 3a to 3d, in four schematical side views, show a stack turning device in various phases of its operation when turning over a vertical container stack;

FIG. 3e shows a top view onto this stack turning device;

FIGS. 4a to 4c in three views corresponding to different phases of operation schematically illustrate a variant of a stack turning means, a still upright container stack being illustrated in end view in FIG. 4a, FIG. 4b showing an associated top view, and FIG. 4c, in a view corresponding to FIG. 4a, showing the now lying container stack;

FIG. 5a shows a side view of a container rotating means for longitudinally orienting of the individually provided containers;

FIG. 5b shows a top view onto this arrangement;

FIG. 6 shows a shunting means for distributing the containers according to container height to two different consecutive conveyors;

FIGS. 7a to 7e show views of a particularly preferred stack turning means to be used in combination with denesting according to FIG. 1, in various phases of operation; and FIG. 8 is a perspective representation of a particularly advantageous gripping means to be used in the arrangement according to FIG. 1.

In FIG. 1, the individual FIGS. 1a to 1e schematically show an arrangement 1 for automatically denesting or providing individually box-type containers of a lying container stack 2 which is supplied in the direction of the arrow I on a conveyor belt 3 provided as a support towards a clamping means 4 of the arrangement 1. By means of lateral pressure medium cylinders 5a, a gripping means 5 grips the foremost container 6 of the container stack 2 on a collar-shaped rim 7 surrounding the container opening, with the container bottom 6a facing forward. The pressure medium cylinders 5a of the gripping means 5 have a horizontal axis and are attached on holding elements 8a, 8b formed by the legs of a frame 9. The pressure medium cylinders 5a are mounted on the legs 8a, 8b in a per se conventional manner and designed such that they are able to accommodate transverse forces when gripping the containers 6; alternatively, also a lever mechanism can be provided which is actuated by the pressure medium cylinders 5a and which accommodates the transverse forces (cf. also FIG. 7). Frame 9 with its legs 8a, 8b is mounted on a linear guide 10 of an arrangement stand 11, this linear guide extending in parallel to the stacking direction of the container stack 2. By a pressure medium cylinder 12 fastened to the stand 11 at A, frame 9 is moved in the direction of arrow I, the foremost container 6 being pushed off the container stack 2.

In doing so, the second container 6' in the container stack 2 is pressed downwards by a clamping pressure medium cylinder 13 fixedly connected to the stand 11, and thus the second container is prevented from being pulled off together with the foremost container 6. The foremost container 6 is advanced to an edge 14. This is effected either by aid of the pressure medium cylinders 5a, which only release the container 6 at edge 14, or the pressure medium cylinders 5a serve merely to pull container 6 out of the container stack 2, whereupon they release it, and the container 6 is moved on towards the edge 14 by means of the conveyor 3. At edge 14, the container 6 tilts downwards due to gravity with its bottom 6a first (cf. FIG. 1c), the pressure medium cylinders 5a releasing the container 6 so that the container 6 comes to stand upright on a support, e.g. a conveyor 3a, with its opening 6b facing upwards, from where it is transported away. If transporting away on the conveyor 3a is transversely to the conveyor 3, a guide or a stop 15 may be present on conveyor 3a so that container 6 which has been tilted down comes to stand on the conveyor 3a in an aligned position. Stop 15 also prevents further tilting or turning of container 6.

When the pressure medium cylinders 5a have released container 5, the frame 9 with its legs 8a, 8b (cf. FIG. 1e) is moved back again in the direction of arrow II (cf. FIG. 1d) so that the pressure medium cylinders 5a are able to grip the next container 6' in the container stack 2, if the container stack 2 is advanced by a corresponding distance, the second container in stack 2 then again being held tightly by aid of the (pneumatic) clamping pressure medium cylinders 13 of the clamping means 4. The previously described process is repeated until the originally second container 6' has been tilted onto the conveyor 3a, etc.

In FIGS. 2a to 2e, illustrations corresponding to those of FIGS. 1a to 1e show a further denesting arrangement 1'. Here, too, a lying container stack 2' is provided, yet the containers, e.g. 6, are supplied to the arrangement 1' by a conveyor 3 in the direction of arrow III with their opening 6b facing forward. Pressure medium cylinders 5a of a gripping means 5, which again have horizontal axes and are mounted on holding elements 8a', 8b' (cf. also FIG. 2e) again grip the formost container 6, e.g. at its collar-shaped container rim 7, yet here so as to move it out of the container stack 2' according to an arcuate movement (cf. FIGS. 2b and 2c) and to deposit it again on the conveyor 3 (or a consecutive conveyor), by pivoting it into a position with the container opening 6b facing upwards (cf. FIG. 2d).

Figure 1A:
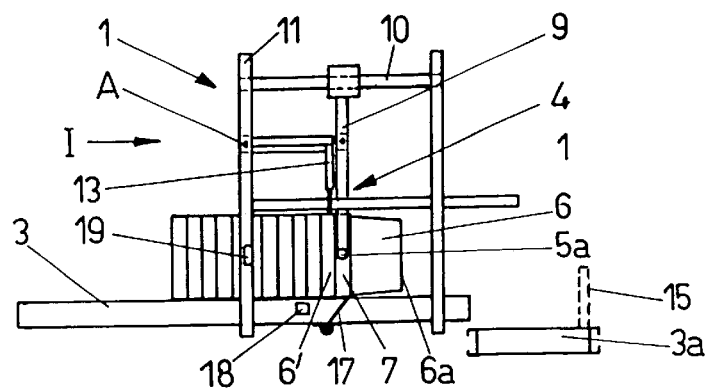
Figure 1B:
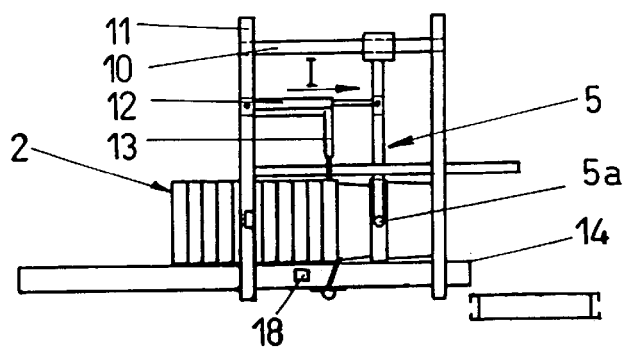
Figure 1C:
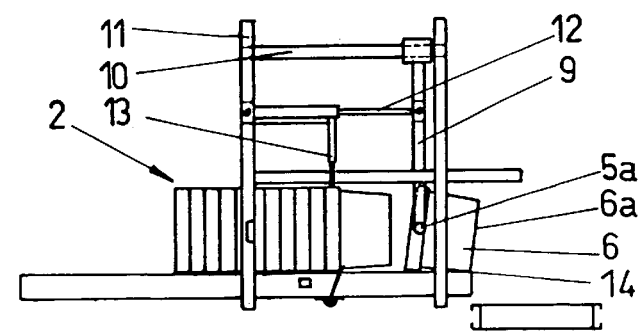
Figure 1D:
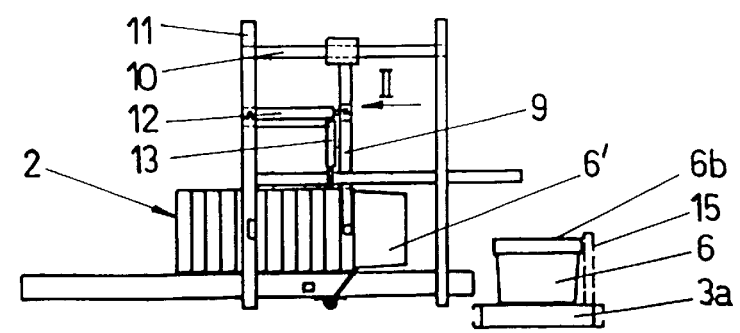
Figure 1E:
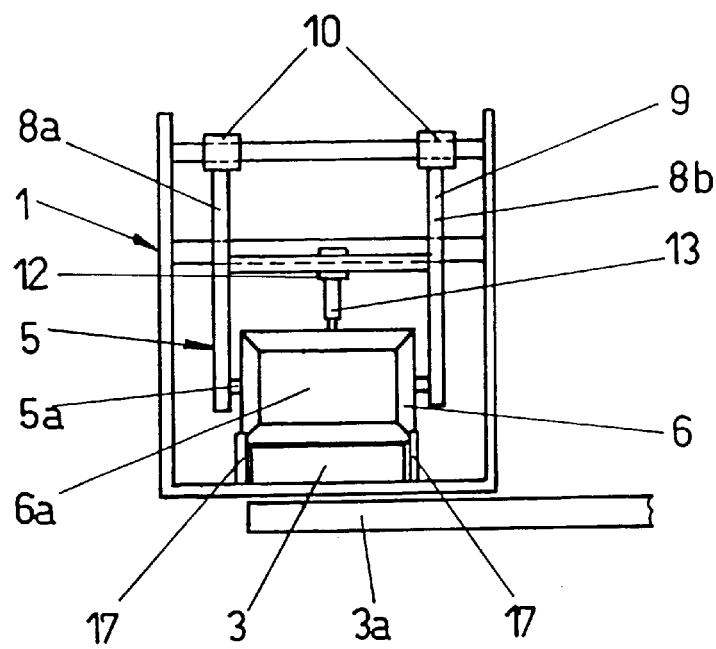
Figure 2E:
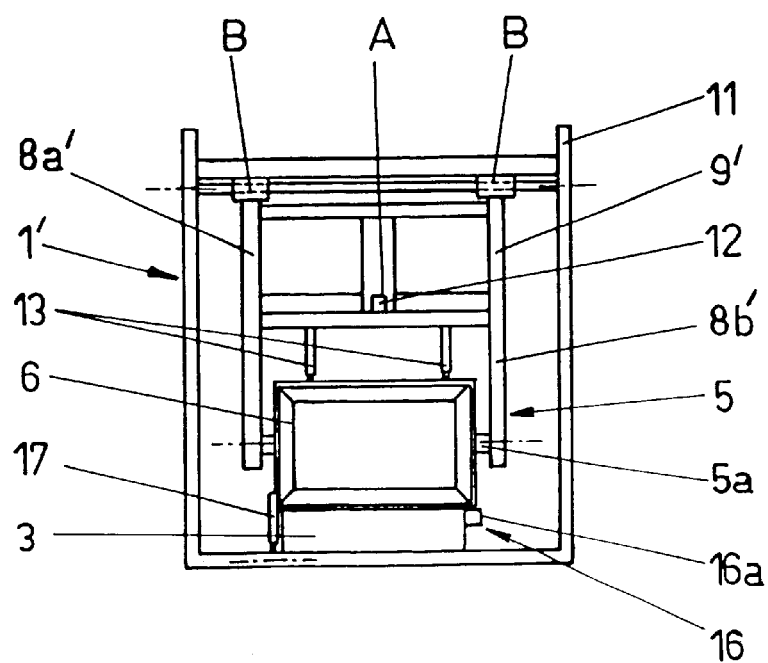
FIG. 2e shows a schematic end view of the denesting arrangement illustrated in FIG. 2a, wherein for the sake of simplicity, a stop is shown on the left-hand side of the container stack, yet such a stop has been omitted on the right-hand side of the stack in order to schematically illustrate a part of the lifting mechanism arranged therebehind.
Figure 2A:
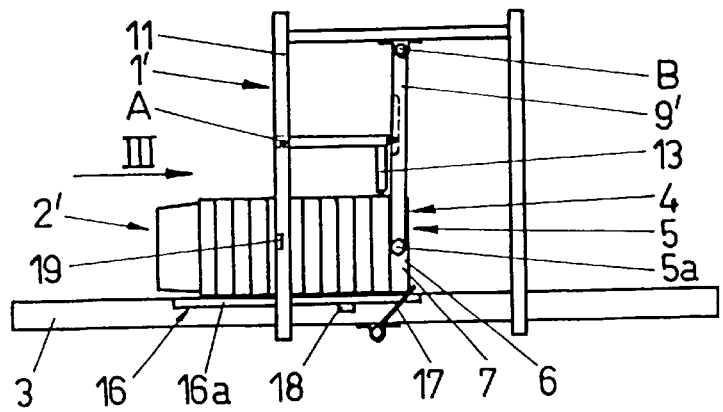
FIGS. 2a to 2d show in corresponding schematic side views a different arrangement for automatically denesting nested containers, wherein the foremost container is pulled out of the remaining container stack by a gripping means according to an arcuate movement and is deposited on the support by being pivoted into a position where the container opening faces upwards.
Figure 2B:
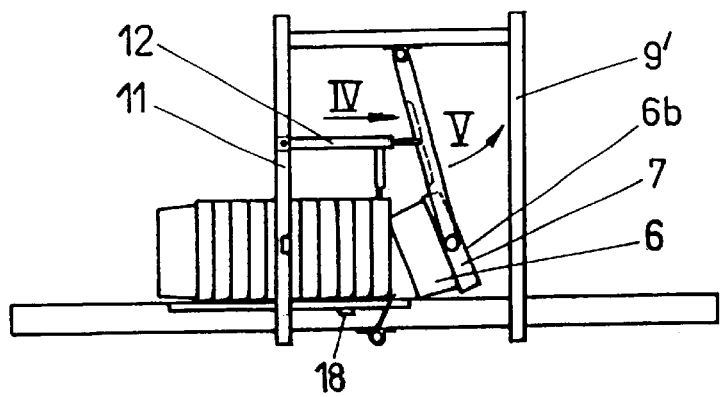
Figure 2C:
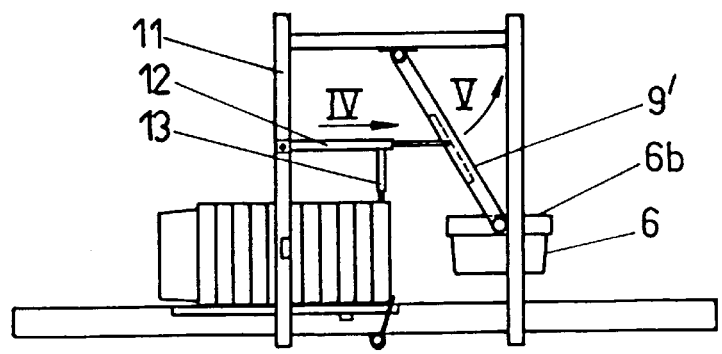
Figure 2D:
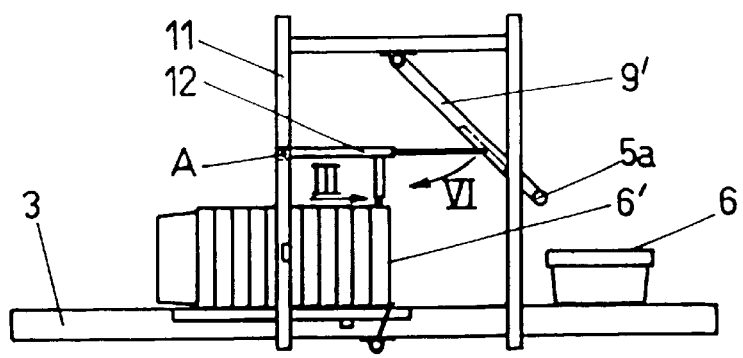

The pressure medium cylinders 5a of the gripping means 5 comprise horizontal axes and are rotatably mounted on their holding elements 8a', 8b', which again are formed by the legs of a bow-shaped frame 9' (cf. also FIG. 2e); frame 9' itself in this case is mounted in the arrangement stand 11 so as to be pivotable on its upper side at B (cf. FIG. 2a); as pivot drive, again a pressure medium cylinder 12 is provided, which is mounted at A on a transverse bar of the stand 11 (FIGS. 2a, 2d and 2e). This pressure medium cylinder 12 pushes frame 9' with its legs 8a', 8b' forwards in the direction of arrow IV (cf. FIGS. 2b and 2c) so that frame 9' together with the pressure medium cylinders 5a carries out an arcuate movement (cf. arrow V in FIGS. 1b and 1c), whereby the foremost container 6a is pulled out of the container stack 2'. In this instance, the end of the piston rod may be hinged on a sliding block (not illustrated) shiftable on the frame 9' in terms of height. On account of the eccentric center of gravity of the container 6 behind (below) the point of engagement of the pressure medium cylinders 5a on container 6, which pressure medium cylinders 5a are rotatably mounted on the holding elements or legs 8a', 8b', the container 6 pivots automatically into an approximately horizontal position (cf. FIGS. 2b and 2c), with the container opening 6b facing upwards.

When the foremost container 6 has been released by the pressure medium cylinders 5a and has been deposited on the conveyor 3 with its opening 6b facing upwards, the legs 8a', 8b' of frame 9' again pivot back into the starting position (cf. arrow VI in FIG. 2d) so as to grip the next container—which had been the second container 6' before in container stack 2'—and the procedure described is repeated after the container stack 2' has been advanced by a corresponding distance—e.g. equal to a collar height.

For the foremost container 6 not to slip on the support during its movement away from the stack 2, or 2', respectively, a lifting mechanism 16 is provided underneath the container stack 2, or 2', respectively, on either side adjacent the conveyor 3, cf. FIG. 2a as well as FIG. 2e, right-hand side. This lifting mechanism 16 is designed with rails or lifting ledges 16a which engage the lateral rims of containers 6 of the container stack 2, or 2', respectively, from below, which lateral rims transversely project beyond the conveyor 3, and thus push stack 2, or 2', respectively, upwards. The lifting mechanism 16 thus lifts up the container stack 2, or 2', respectively, even before the first container 6 has been pulled out, and lowers it only after the foremost container 6 has been located at a distance from the container stack 2, or 2', respectively. Suitably, such a lifting mechanism 16 is also provided in the arrangement 1 according to FIG. 1, yet this has not been illustrated in FIG. 1.

Also according to FIG. 2, furthermore, two pressure medium cylinders 13 are provided as clamping means 4 which push downwards the respective second container 6' in the container stack 2' and thus clamp it tightly, whereby the second container 6'—and all the following containers of stack 2'—is/are kept back while the first container 6 is moved out, and is/are not pulled along therewith.

According to the exemplary embodiments according to FIGS. 1 and 2, one pivotable stop 17 is provided on either side of the container stack 2, or 2', respectively, on the conveyor belt 3. In this manner, the arriving container stack 2, or 2', respectively, is stopped at precisely the correct position for the clamping means 4. While the pressure medium cylinders 5a grip the foremost container 6, the stops can lower themselves, so that pulling the foremost container 6 out of the container stack 2, or 2', respectively, will not be impeded. During or after deposit of this foremost container 6 on the conveyor belt 3, or 3a, respectively, stop 17 may be tilted up into its effective position again.

Below the container stack 2, or 2', respectively, a trigger photoelectric barrier 18 (cf. FIGS. 1a, 1b and 2a, 2b) is mounted which temporally controls upward and downward tilting of the stop 17 and/or activation of the pressure medium cylinders 12 and 13.

To monitor the remaining containers, furthermore a monitoring photoelectric barrier 19 (cf. FIGS. 1a and 2a) are mounted on the stand 11 so that it can be sensed automatically as soon as a minimum amount of remaining containers is fallen short of.

In FIGS. 3a to 3e, a stack turning device 20 is illustrated, the course of turning a vertical container stack 2a into a horizontal position being illustrated in schematical side views in FIGS. 3a to 3d; FIG. 3e shows a schematical top view of this stack turning device 20 to which several container stacks 2a, and 2a', respectively, are successively supplied.

The container stack 2a to be turned into the horizontal position abuts a sliding support 22 (cf. FIG. 3a) pivotable about an upper axle 21, which sliding support may be a sliding plate or interconnected upright slide rails. In FIG. 3b the sliding support 22, driven by an e.g. pneumatic, pressure medium cylinder 23, begins to pivot about the upper axle 21 fixed in the stand, and in doing so it pushes the lower region of the stack 2a to the right-hand side according to the illustration in FIGS. 3a to 3e, until the latter has reached a conveyor 3b provided for transporting the stack off; in this instance, the stack 2a tilts over and comes to be supported on the sliding support 22; in the upper stack region, a stop is being contacted which is formed by a roller 25 mounted on a transverse beam 24 of the stand not further denoted in detail. Conveyor 3b pulls away the lower region of the container stack 2a in the direction of arrow VII (cf. FIGS. 3b and 3c), while the upper stack region abuts on roller 25 and is held back by the latter, and while the pivoting movement of the slide support 22 continues so that the container stack 2a assumes an ever more inclined position. Finally, the container stack 2a slides downwards along the sliding support 22 until the uppermost container has passed the end of the sliding support 22 and the stack comes to lie horizontally on the conveyor 3b with the container bottoms 6a facing forward, which conveyor 3b then further transports stack 2 in the now lying posture to the arrangement according to FIG. 1 (cf. FIG. 3d). The sliding support 22 now pivots into its vertical starting position so as to support the next vertical container stack 2a'.

Suitably, the arriving container stack 2a is moved from the side, via a transverse conveyor 3c, into the turning device 20 (cf. FIG. 3e) since then it is possible to simply mount the sliding support 22 only pivotably.

In FIG. 4, a different stack turning device 20' is illustrated, FIG. 4a showing a side view, and FIG. 4b showing a top view onto the stack turning device 20' with the still standing, vertical container stack 2a. The container stack 2a abuts on the perpendicular fork arms 26 and is located on conveyor 3c, e.g. a roller conveyor, above horizontal fork arms 27 which are arranged approximately at right angles to the fork arms 26. The container stack 2a may be guided by conveyor 3c in this position as far as to the stop on the fork arms 26, or it may be put onto the fork arms 27 in any other manner. The angled fork arms 26, 27 form a structural unit and are mounted to be pivotable by about 90° about their horizontal angle axle 28.

The originally vertical, long fork arms 26 are pivoted into the horizontal to turn stack 2a in the direction of arrow VIII (cf. FIG. 4a), and in this instance they act as support for the stack 2a. The container stack 2a is lifted from the originally horizontal, short fork arms 27 which move upward, e.g., between the rollers of the roller conveyor 3c and tilted into a lying posture, cf. the lying stack 2 in FIG. 4c, the fork arms 26 simultaneously being pivoted into a horizontal position so that the container stack 2a is controlledly turned. It now lies transversely to the conveyor 3c on a support 3d, preferably a further conveyor, in this instance with the container openings 6b facing forward (cf. FIG. 4c). The conveyor 3d then guides the turned container stack 2 to the denesting device 1' proper according to FIG. 2.

In FIGS. 5a and 5b, a device 29 for longitudinally orienting containers 6 provided individually as described before and located transversely to the conveyor 3, is illustrated in side view and in top view, respectively. The containers 6 are advanced by conveyor 3, here, e.g., a roller conveyor, in the direction of arrow IX (FIG. 5a), of which at least a few of the rollers 30 are driven. At either side of conveyor 3, one guide 31 each is provided so as to guide the containers 6 along the conveyor 3; guides 31 narrow in transport direction until the distance between them merely allows for the passage of a longitudinally oriented container 6. In front of this narrowed portion 32, two individually upwardly shiftable cylinders 33a and 33b, respectively, are adjacently mounted as stops on the conveyor 3. Depending on the direction in which container 6 is to be rotated (to be oriented e.g. with a container flap or a bar code on a certain side), the one cylinder, e.g. 33a, is shifted upwards to above the conveying plane 34, whereas the other cylinder, e.g. 33b, will remain below the conveying plane 34 or will be retracted so that it will be no impediment for the arriving container 6. The control signal for this actuation of cylinders 33a, 33b may come from a detector 35 which detects on which side of container 6 the container flap or the barcode is located. In FIG. 5b, the right-hand cylinder 33b viewed in conveying direction (arrow IX in FIG. 5a) has been lowered, whereas the left-hand cylinder 33a has been pushed up from the conveying plane 34. Container 6 which has been transported there, on one of its sides—the left-hand side—is held back by upwardly protruding cylinder 33 by abutment thereon, whereas the other—right-hand—side of container 6 is free so that container 6 is moved on by the conveyor 3 under rotation about the stop, i.e. the cylinder 33a, since the right-hand container side moves faster as compared to the left-hand container side. Container 6, which has already been somewhat turned—as apparent from FIG. 5b, then is forced to completely longitudinally align in the narrowed portion 32 and is moved on by conveyor 3.

In FIG. 6, a shunting means 36 is shown for distributing the containers 6 according to the container height onto two separate conveying paths or consecutive conveyors 3e, and 3f, respectively. Just like the device 29 shown in FIG. 5 for longitudinally orienting the container 6, also the shunting means 36 comprises two retractable and extendable cylinders 33a and 33b, respectively, adjacently mounted on the conveyor 3. A container height sensor 37, e.g. with photo-electric barriers which are mounted at certain levels, may sense the height of the passed-by containers 6 and send a signal to each of the retractable and extendible cylinders 33a and 33b for extension or retraction, respectively. Simultaneously, a pivotable access lever 38 may be actuated, which, on the one hand, blocks access to the one consecutive conveyor, e.g. 3e, and, on the other hand, guides container 6 to the other consecutive conveyor, e.g. 3f. In FIG. 6, cylinder 33a which is located on the left-hand side in transporting direction X protrudes from the conveying plane, whereas the right-hand cylinder 33b has been lowered to below the conveying plane 34. This causes container 6 to run up against the left-hand cylinder 33a, it being rotated about its own axis. After having been sufficiently rotated, container 6 is moved past cylinder 33a and gets on the right-hand consecutive conveyor 3f in the direction of arrow X, the lever or pivot arm 38 assisting this movement and blocking access to the left-hand consecutive conveyor 3e.

Figure 7A:
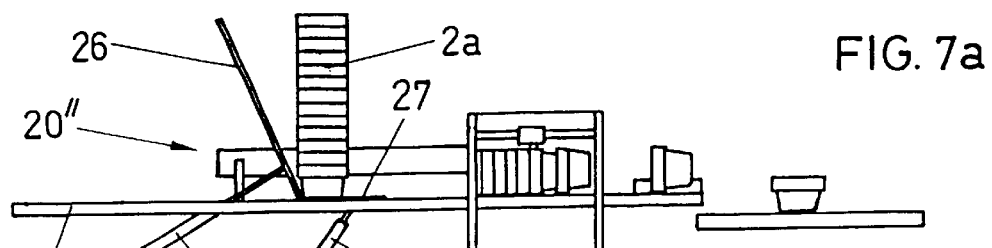
Figure 7B:
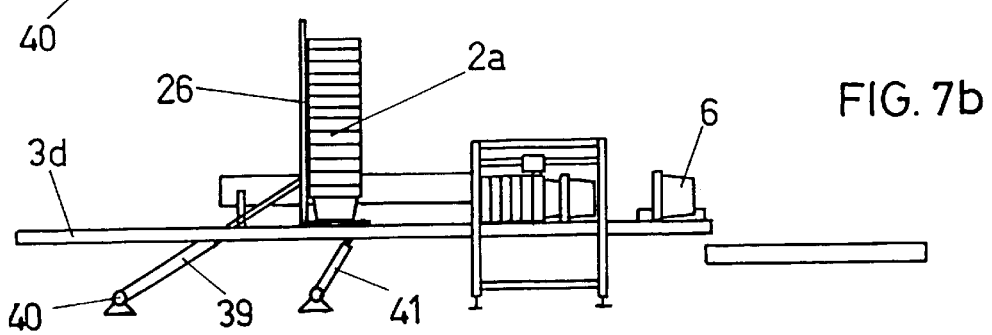
Figure 7C:
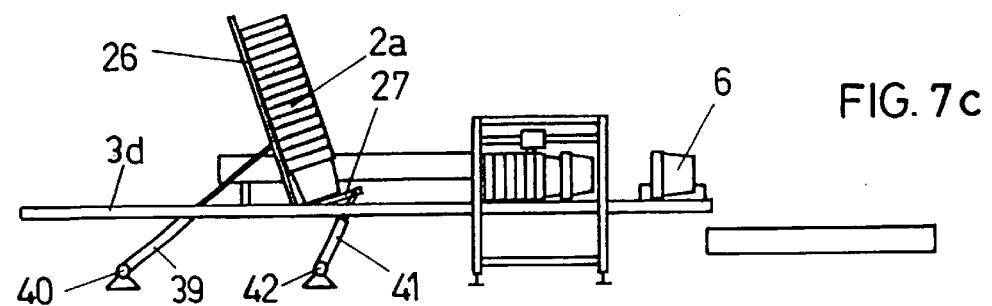
Figure 7D:
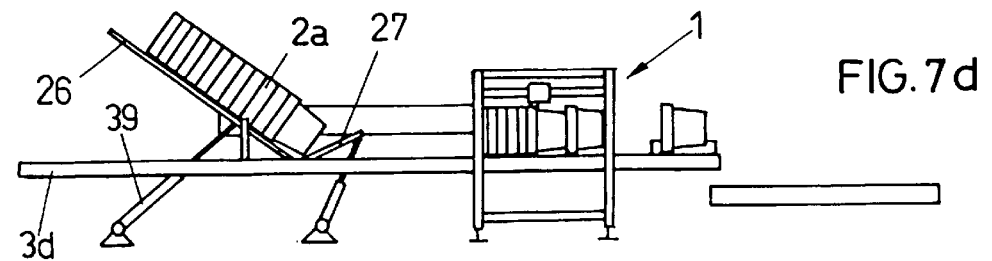
Figure 7E:
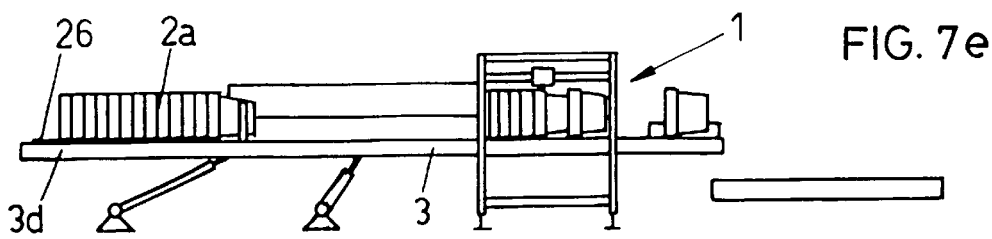

In FIGS. 7a to 7e, a side view of a further embodiment of a stack turning device 20" is shown, the course of turning being schematically illustrated. The vertical, upright container stack 2a is advanced on conveyor 3d to the stack turning device 20", as has been described in FIG. 4. The stack turning device 20" in turn has two pairs of fork arms 26, 27, the shorter fork arms 27 of the one pair initially being present, according to FIG. 7a, below the stack 2a advanced for turning, and the other, longer fork arms 26 being pivoted upwards by a pressure medium cylinder 39 mounted so as to be pivotable about an axle 40 from a horizontal position present below the conveying plane, into a vertical position until they abut on the container stack 2a. In FIG. 7b, the fork arms 26 are shown in this vertical position in contact with the container stack 2a. A separate pressure medium cylinder 41 provided below the horizontal fork arms 27 and also mounted to be pivotable about an axle 42 (cf. FIG. 7c) engages these fork arms 27 so that the horizontal fork arms 27 and thus the container stack 2a are gradually brought into a slanted position (FIG. 7c) by extension of the piston rod of the pressure medium cylinder 41, wherein simultaneously the stack 2a and the fork arms 26 are brought into a slanted position and now are supported by the pressure medium cylinder 39. The pressure medium cylinder 39 is gradually retracted during this movement of turning, it being simultaneously pivoted about its axle 40. The pressure medium cylinder 41 likewise is pivoted about its axle 42 and pushes the shorter fork arms 27 upwards at least until the container stack 2a would start to tilt (i.e. until its center of gravity, viewed in vertical projection, is no longer present above the base face defined by the fork arms 27). Subsequently, the pressure medium cylinder 41 is retracted again, and the fork arms 27 are pivoted into the horizontal starting position (FIG. 7d), while simultaneously the fork arms 26 on which the mass of the container stack 2a now rests gradually are further pivoted together with the container stack 2a and finally also are brought into the horizontal position (FIG. 7e). Now the turned container stack 2a is moved away from the stack turning device 20" by the conveyors 3d and 3 and towards the arrangement 1 for denesting, where denesting is effected as described before, e.g. by way of FIG. 1.

In FIG. 8, a modified gripping means 5' for the arrangement 1 for automatic denesting of a lying container stack 2, in particular of the embodiment according to FIG. 1, is schematically illustrated on an enlarged scale, wherein merely one side of the gripping means 5' is shown in more detail as regards its individual parts, in particular a gripping jaw unit 45, whereas the other side is partly occluded, yet is of equal construction so that it suffices to explain one side.

Each gripping jaw unit 45 comprises a pressure medium cylinder 46 of horizontal orientation which is mounted on a holding means, again in the form of a leg 8a of a frame 9. A gripping jaw 47 is mounted on a pivot lever 48 actuated by the pressure medium cylinder 46. The pivot lever 48 has an upper plate 49a and a lower plate 49b between which at one end the gripping jaw 47 equipped with a friction material (rubber) is held. At the other end, an axle 50 is mounted between plates 49a, 49b, at which the pressure medium cylinder 46, which is mounted to be pivotable about an axle 51, engages with its piston rod.

The pivot lever 48 in turn is mounted to be pivotable about a pivot axle 52, which is mounted on a bracket 53 that is fixedly attached, e.g. welded, to the respective leg 8a of frame 9 and also carries the pressure medium cylinder 46 via axle 51.

If the pressure medium cylinder 46 pushes in direction C, while pivoting about its axle 51, the pivot lever 48 is pivoted in direction D about axle 52. By this movement of the pivot lever 48, the gripping jaw 47 is pressed against the collar-shaped rim 7 of the first container 6 of container stack 2. Due to the movement of frame 9 already described with respect to FIG. 1, the first container 6 is then moved away from container stack 2, this movement acting in the sense of an increase of the clamping effect of the gripping jaws 47. By retracting the pressure medium cylinder 46, the pivot lever 48 is again pivoted into the direction opposite to direction D so that the gripping jaws 47 again release the rim 7 of the first container 6.

What is claimed is:

1. An arrangement for automatically denesting containers conveyed on a horizontal conveyor with container bottoms facing forward and nested in each other in a container stack in a lying posture, and for depositing a container on a support with a container opening facing upwards, the arrangement comprising:
   pressure gripping means for gripping and moving a respective first container of said container stack, said gripping means having a pair of lateral pressure-medium cylinders, each pressure-medium cylinder of the pair having a horizontal axis with the horizontal axes of the pair oriented in a common horizontal plane;
   holding elements movable in a stacking direction, said holding elements supporting said gripping means at lower portions of said holding elements;
   clamping means for holding back the container stack, with the first container being left free of the container stack;
   wherein the support is positioned immediately beneath an end of said horizontal conveyor and wherein a denested container is moved to the end of the conveyor, tilted by gravity about the end of the conveyor and falls onto the support with its container opening facing upward.

2. An arrangement according to claim 1, characterized in that the pressure medium cylinders are rotatably arranged on the holding elements.

3. The arrangement according to claim 1, further comprising a pressure medium cylinder for driving the holding elements in the stacking direction.

4. The arrangement according to claim 1, wherein said gripping means comprise a pair of gripping jaws which are pressed against the first container, each gripping jaw being attached to a respective pivoting lever actuated by a respective pressure medium cylinder.

5. An arrangement according to claim 1, characterized in that the holding elements are mounted to be linearly displaceable in parallel to the container stack.

6. The arrangement according to claim 5, wherein the holding elements are mounted on a linear guide.

7. The arrangement according to claim 1, further comprising a shunting means for distributing denested containers to one of a plurality of conveying paths according to container height.

8. The arrangement according to claim 7, further comprising vertically arranged photoelectric barriers for sensing container height as a container moves on the horizontal conveyor toward the shunting means.

9. The arrangement according to claim 1, wherein said clamping means comprises a pressure medium cylinder which pushes at least a second container in the container stack downwards and a lifting mechanism which lifts the container stack off the horizontal conveyor.

10. The arrangement according to claim 9, wherein said clamping means further comprises a stop which is pivoted out of engagement with the container stack.

11. The arrangement according to claim 10, further comprising a trigger photoelectric barrier for actuating one of the clamping means pressure medium cylinder or the stop.

12. The arrangement according to claim 1, further comprising a pneumatically-actuated stack turning device for handling container stacks prior to feeding the container stacks to the gripping means.

13. The arrangement according to claim 12, wherein said stack turning device comprises a stack sliding support which is vertically oriented in a resting position and is pivotable about a horizontal axis.

14. The arrangement according to claim 13, further comprising a stand and a roller mounted on the stand and extending opposite said stack sliding support, said roller controlling movement of a container stack as the container stack is pivoted into a horizontal position.

15. An arrangement according to claim 1, characterized in that a monitoring photoelectric barrier is provided for sensing the remaining containers of the stack.

16. The arrangement according to claim 15, further comprising angled forked arms pivotally mounted on the stack turning device to pivot about a horizontal angle axis.

17. The arrangement according to claim 15, wherein the stack turning device comprises a pair of supporting devices for supporting the container stack and pressure medium cylinders for pivoting the one of the pair of supporting devices independently of the other.

18. The arrangement according to claim 1, further comprising a container rotating device for rotating the first container from a transverse orientation into a longitudinal orientation.

19. An arrangement according to claim 18, characterized in that the container rotating device has an associated control unit for rotating each container with a predetermined side facing forward.

20. The arrangement according to claim 18, wherein the container rotating device comprises two stop cylinders selectively projectable vertically above the conveying plane of the horizontal conveyor, the width of the horizontal conveyor narrowing at a location downstream from the stop cylinders.

21. An arrangement for automatically denesting containers conveyed on a horizontal conveyor with container openings facing forward and nested in each other in a container stack in a lying posture, and for depositing a container on a support with the container opening facing upwards, the arrangement comprising:

pressure gripping means for gripping and moving a respective foremost container of said container stack, said gripping means having a pair of lateral pressure-medium cylinders, each pressure-medium cylinder of the pair having a horizontal axis with the horizontal axes of the pair oriented in a common horizontal plane;

holding elements movable in a stacking direction, said holding elements supporting said gripping means at lower portions of said holding elements;

clamping means for holding back the container stack, with the foremost container being left free of the container stack; and movement control means for controlling the movement of the holding elements so as to move the foremost container out of the container stack, to pivot the foremost container and to deposit the foremost container onto the support with its container opening facing upwards.

22. An arrangement according to claim 21, characterized in that the holding elements have an associated connecting-link guide for control of their movement.

23. An arrangement according to claim 21, characterized in that the holding elements have an associated four-bar linkage for control of their movement.

24. The arrangement according to claim 21, further comprising a pressure medium cylinder for driving the holding elements in the stacking direction.

25. The arrangement according to claim 21, wherein said gripping means comprise a pair of gripping jaws which are pressed against the foremost container, each gripping jaw being attached to a respective pivoting lever actuated by a respective pressure medium cylinder.

26. An arrangement according to claim 21, characterized in that a monitoring photoelectric barrier is provided for sensing the remaining containers of the stack.

27. The arrangement according to claim 21, further comprising a shunting means for distributing denested containers to one of a plurality of conveying paths according to container height.

28. The arrangement according to claim 21, further comprising vertically arranged photoelectric barriers for sensing container height as a container moves on the horizontal conveyor toward the shunting means.

29. The arrangement according to claim 21, wherein the holding elements are pivotally mounted on a frame.

30. The arrangement according to claim 29, wherein said clamping means comprises a pressure medium cylinder which pushes at least a second container in the container stack downwards and a lifting mechanism which lifts the container stack off the horizontal conveyor.

31. The arrangement according to claim 30, wherein said clamping means further comprises a stop which is pivoted out of engagement with the container stack.

32. The arrangement according to claim 31, further comprising a trigger photoelectric barrier for actuating one of the clamping means pressure medium cylinder or the stop.

33. The arrangement according to claim 21, further comprising a container rotating device for rotating the foremost container from a transverse orientation into a longitudinal orientation.

34. An arrangement according to claim 33, characterized in that the container rotating device has an associated control unit for rotating each container with a pre-determined side fang forward.

35. The arrangement according to claim 33, wherein the container rotating device comprises two stop cylinders selectively projectable vertically above the conveying plane of the horizontal conveyor, the width of the horizontal conveyor narrowing at a location downstream from the stop cylinders.

36. The arrangement according to claim 21, further comprising a pneumatically-actuated stack turning device for handling container stacks prior to feeding the container stacks to the gripping means.

37. The arrangement according to claim 36, wherein said stack turning device comprises a stack sliding support which is vertically oriented in a resting position and is pivotable about a horizontal axis.

38. The arrangement according to claim 36, further comprising a stand and a roller mounted on the stand and extending opposite said stack sliding support, said roller controlling movement of a container stack as the container stack is pivoted into a horizontal position.

39. The arrangement according to claim 36, further comprising angled forked arms pivotally mounted on the stack turning device to pivot about a horizontal angle axis.

40. The arrangement according to claim 36, wherein the stack turning device comprises a pair of supporting devices for supporting the container stack and pressure medium cylinders for pivoting the one of the pair of supporting devices independently of the other.

* * * * *